Patented May 24, 1949

2,471,129

UNITED STATES PATENT OFFICE 2,471,129

HYDROCARBON SYNTHESIS

Hans G. Vesterdal, Elizabeth, N. J., assignor to Standard Oil Development Company, a corporation of Delaware No Drawing. Application September 7, 1946, Serial No. 695,564

5 Claims. (Cl. 260—449.6)

The present invention relates to improvements in the art of synthesizing hydrocarbons and more particularly it relates to catalysts which are particularly suitable for this reaction.

The synthesis of hydrocarbons from carbon monoxide and hydrogen is a matter of record and to some extent in certain countries, such as Germany, gasoline and other normally liquid hydrocarbons have been prepared commercially in this manner. Originally the synthesis of hydrocarbons from carbon monoxide and hydrogen was accomplished in the presence of a cobalt catalyst usually supported on a material such as kieselguhr and promoted with a material such as thoria. This synthesis, usually carried out at around 400° F., resulted in the production of straight-chain paraffinic compounds for the most part. Later a process was developed in which the catalyst was iron, and in which the temperature was substantially higher than in the first-mentioned process; that is to say, it was somewhere between about 450° to 675° F. In this latter type of process where the iron catalyst was used, the process further differed from the earlier one in that the ratio of hydrogen to carbon monoxide fed to the reaction zone was somewhat lower, being of the order of, say, 1 to 1½ mols of hydrogen per mol of carbon monoxide in the feed to the reaction. The product from the process employing the iron catalyst was different from that using the cobalt catalyst in that the former contained a substantial quantity of olefins and, therefore, the gasoline made using the iron catalyst usually possessed a higher octane number than produced in the cobalt catalyst process.

There have been a number of proposals made by prior investigators for preparing a suitable iron type catalyst utilizable in the hydrocarbon synthesis reaction. For example, it has heretofore been proposed that a suitable catalyst for the hydrocarbon synthesis may be made by roasting pyrites or a spent pyrites to convert the same to an iron oxide and then to reduce the iron oxide to metallic iron. Other proposals have included reducing a natural iron oxide, mineral or ore such as magnetite, hematite, limonite, etc. Still other proposals include the use of those types of iron commonly employed in the synthetic ammonia process. Furthermore, certain promoters designed to increase the activity of the catalyst have been proposed heretofore.

In a specific sense, my present invention relates to improving the activity of an iron catalyst in the hydrocarbon synthesis reaction by incorporating therein certain promoters. It is known that good catalysts for hydrocarbon synthesis are produced by the addition of potassium compounds, such as $K_2CO_3$, $KF$, or $K_3PO_4$ to iron oxide followed by reduction in the temperature range 600 to 1600° F. I have now found that by combining fluoboric acid with a metal such as potassium or sodium to form metal fluoborates, superior promoters for iron catalysts are formed. Although $NaBF_4$ may be used as promoter, I prefer the potassium fluoborate, $KBF_4$. The promoter may be added to pure iron oxide or hydroxide or to iron ores such as magnetite, hematite, limonite, etc., in amounts varying between about 0.2 and 10.0% based on the iron present.

Various procedures may be employed for the addition of the promoter to the iron base. Thus the base may be moistened with an aqueous solution of the promoter at room temperature followed by evaporation of the water, or the aqueous solution, or even the molten promoter itself may be sprayed into the zone containing the iron base. This method may also be employed for reactivation of partly spent catalyst. The iron base may be reduced with hydrogen or other reducing gases either before or after addition of the promoter. Reduction temperatures may be varied between about 500° and 1600° F. When reducing the catalyst after adding the promoter, however, the temperature should preferably not exceed the melting point of the promoter, so that when using $KBF_4$, the reduction temperature should preferably be held below 986° F. and with $NaBF_4$ below about 720° F.

Other fluoborates such as calcium and caesium fluoborates may also be used as promoters for the iron catalysts. Also mixtures of fluoborates may be used. After reduction these catalysts may be used either in fixed bed, "fluid" catalyst, or moving bed types of operation.

The main object of my invention, therefore, is to prepare a catalyst comprising iron which is adapted not only to promote the reaction between carbon monoxide and hydrogen to form hydrocarbons and oxygenated hydrocarbons, but also to promote to a greater degree than catalysts heretofore employed, the polymerization of olefins so that normally gaseous olefins existing in a nascent state will be polymerized or condensed to olefinic hydrocarbons boiling in the gasoline boiling range.

Other and further objects of this invention will appear from the following more detailed description and claims.

To illustrate my invention I set forth below several specific examples:

Example 1

9.11 grams of potassium fluoborate ($KBF_4$) were dissolved in 225 cc. of hot distilled water. The solution was poured onto 491 grams powdered iron oxide (or commercial pigment: red iron oxide) while mixing to form a paste. The paste was dried at 220° F., then pilled in the presence of 2 per cent of a hydrogenated vegetable oil such as cotton, corn or peanut oil which was used as a lubricant for the pilling operation. The said vegetable oil was burned from the pills by heating in air at 850° F. for 3 hours. On reducing the pills for 4 hours at 900° F. with hydrogen at atmospheric pressure (1000 volumes $H_2$ per volume of catalyst per hour) the catalyst was ready for synthesis operation.

*Example 2*

A catalyst was prepared in which granular specular hematite was employed instead of the red iron oxide in Example 1 and impregnated as in Example 1 with $KBF_4$ in the same manner but employing ten times as much $KBF_4$. Upon grinding and classifying to the proper particle size (average about 60 microns) followed by reduction in a fluid solids reactor for 4 hours at 900° F. with hydrogen at a linear velocity of one foot per second and atmospheric pressure, this catalyst was especially suited for hydrocarbon synthesis in "fluid" operation.

*Example 3*

The same as in Example 2 except that the reduction temperature was 700° F., the hydrogen pressure 300 pounds per square inch and the linear velocity 0.5 ft. per second.

*Example 4*

The same as in Example 3 except that the promoter was $NaBF_4$ instead of $KBF_4$.

*Example 5*

The catalyst prepared in Example 1 was used in a test for production of hydrocarbons from carbon monoxide and hydrogen. Fifty cubic centimeters of the catalyst pills were placed in a reactor surrounded by a jacket containing a heat exchange fluid for temperature control. Synthesis gas in which 0.92 mol of hydrogen were present per mol of carbon monoxide was passed through the catalyst bed at 250 pounds per square inch gauge pressure at a flow rate of 200 volumes of gas (STP) per volume of catalyst per hour while adjusting the temperature to give about 95 per cent conversion of carbon monoxide. Under these conditions a yield of liquid hydrocarbons ($C_4+$) of 211 cc. per cubic meter of carbon monoxide plus hydrogen consumed were obtained when operating at 550° F. with a carbon monoxide conversion of 96.4 per cent. Including the propane and propylene produced, the yield increased to 254 cc. per cubic meter of $CO+H_2$ consumed. The product water produced at the same time amounted to 53.7 cc. per cubic meter of $CO+H_2$ consumed and contained about 14.5 weight per cent alcohols and 3.7 weight per cent acids calculated as ethyl alcohol and acetic acid, respectively. After operation for 258 hours at 500 to 559° F., the catalyst was extracted with benzene followed by carbon and hydrogen analysis of the extracted catalyst. The wax extracted amounted to 13.2 weight per cent on the extracted catalyst while the carbon and hydrogen of the non-extracted or residual contaminants were 2.48 per cent and 0.18 per cent, respectively. Assuming a hydrogen to carbon ratio of 15 to 85 in the residual wax, the amount of wax left on the catalyst amounted to 1.2 per cent, corresponding to about 1.0 per cent carbon. The carbon on the catalyst on a wax-free basis was, therefore, 2.48 per cent minus 1.0 per cent, equaling 1.48 per cent, and the wax content 13.2 plus 1.2, equaling 14.4 per cent.

The catalyst was quite stable as indicated by a conversion of 95.3 per cent at 539° F. in hours 102 to 147 of the run, as compared to 96.4 per cent conversion at 549° F. in hours 213 to 258.

The hydrocarbon product produced was unsaturated, as indicated by an olefin content of 80.8 weight per cent in the $C_4$ cut, and 85.3 per cent in the $C_5$ cut.

In the following table the $KBF_4$ promoted catalyst is compared with $Fe_2O_3$ promoted with KF and with $K_2CO_3$.

*Hydrocarbon synthesis*

[0.8 to 1.0 ratio $H_2/CO$, 200 V./V./hr., 250 p. s. i. g. Catalysts reduced with $H_2$ (1000 V./V./hr.) for 4 hours at 900° F. before the tests]

| Catalyst Base | $Fe_2O_3$ | | |
|---|---|---|---|
| Promoter | 1.8% $KBF_4$[1] | 1% $KF$[1] | 1% $K_2CO_3$[2] |
| Avg. Catalyst Temp., °F | 549 | 640 | 607 |
| Yield $C_4+$, cc./m.³ $CO+H_2$ cons | 211 | 215 | 188 |
| Wt. Percent C on catalyst per 100 hrs | 0.59 | 2.36 | 2.74 |

[1] Percentages are on a weight basis.
[2] Reduced at 900° F. followed by sintering in $H_2$ at 1200° F. for 4 hours to reduce carbon formation.

The above data show that $KBF_4$ is a true promoter for in two comparative runs, one using the $KBF_4$ and the other KF, it will be noted that the yield of liquid product containing $C_4+$ hydrocarbons was approximately the same in both runs even though the run in which the $KBF_4$ was used was conducted at a temperature 91 degrees below that employed in the run using KF. However, the important advantage of $KBF_4$ over KF will be noted in the formation of carbon in the two runs. Thus, in the case of the $KBF_4$ promoted catalyst 0.59 weight per cent carbon was formed on the catalyst per 100 hours of the run while in the KF promoted catalyst 2.36 weight per cent carbon was formed on the catalyst per 100 hours of the run. KF is a commonly used promoter and one of the best prior to my invention. However, all the known promoters had the defect that the runs in which they were used produced an inordinate amount of carbonaceous deposits on the catalyst and in a fluid system this is highly undesirable since carbonaceous deposits on the catalyst not only lower its activity but cause physical disintegration of the catalyst to the extent that it cannot be fluidized in a dense, turbulent, ebullient mass of catalyst but rather tends to pass out of the reactor at the top thereof with the product vapors. As is known, in the bottom drawoff type of operation it is highly desirable that the main bulk of catalyst be separated from the vapors in the upper portion of the reactor and remain therein while the product vapors issue from the reactor substantially freed of catalyst and containing merely traces of fines. As stated, however, when the catalyst is highly carbonized, it is impossible to achieve this result; hence the importance of minimizing the amount of carbon formed on the catalyst during the operation.

Numerous modifications of my invention may be made by those who are familiar with this art without departing from the spirit thereof.

I claim:

1. The method of synthesizing hydrocarbons which comprises contacting a mixture of carbon monoxide and hydrogen at elevated temperatures with a catalyst consisting essentially of a reduced form of iron oxide having incorporated therein an alkali metal fluoborate.

2. The method set forth in claim 1 in which the alkali metal fluoborate is potassium fluoborate.

3. The method of synthesizing hydrocarbons and oxygenated hydrocarbons which comprises contacting a mixture of carbon monoxide and hydrogen at elevated temperatures and pressure with a catalyst consisting essentially of a reduced form of iron oxide having incorporated therein a salt of fluoboric acid.

4. The method of claim 3 in which the catalyst contains from 0.2 to 10 weight per cent of a salt of fluoboric acid.

5. The method of claim 3 in which the catalyst contains potassium fluoborate.

HANS G. VESTERDAL.

REFERENCES CITED

The following references are of record in the file of this patent:

UNITED STATES PATENTS

| Number | Name | Date |
| --- | --- | --- |
| 1,148,570 | Bosch et al. | Aug. 3, 1915 |
| 2,183,145 | Michael et al. | Dec. 12, 1939 |
| 2,398,773 | Connolly | Apr. 23, 1946 |